March 19, 1957 — F. McCALL ET AL — 2,785,615
TRACTOR PULLED APPARATUS

Filed July 20, 1953 — 2 Sheets-Sheet 1

FLOYD McCALL,
LLOYD McCALL,
INVENTORS

BY Lyon & Lyon

ATTORNEYS

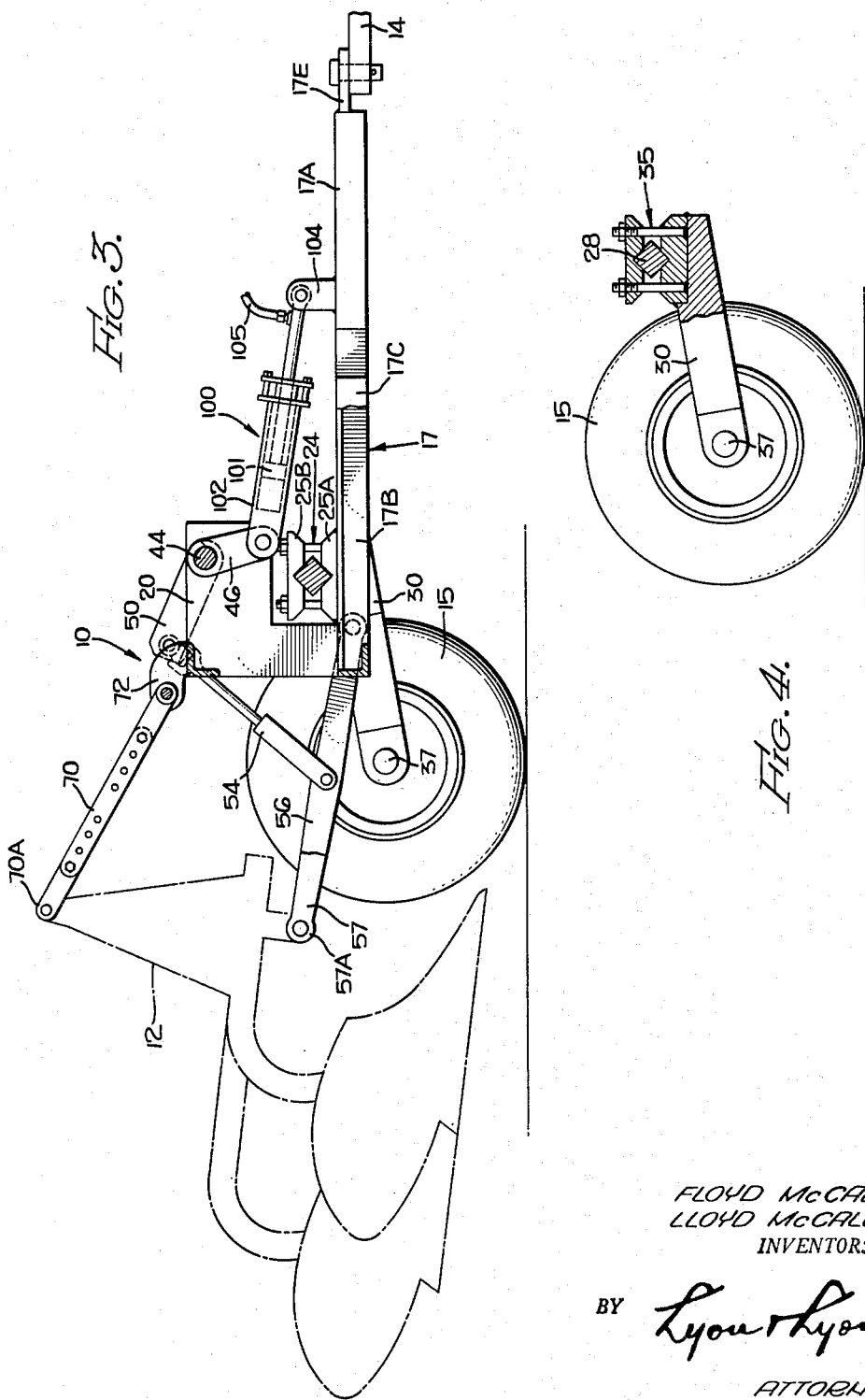

United States Patent Office 2,785,615
Patented Mar. 19, 1957

2,785,615
TRACTOR PULLED APPARATUS
Floyd McCall and Lloyd McCall, Romoland, Calif.

Application July 20, 1953, Serial No. 369,018

4 Claims. (Cl. 97—46.27)

The present invention relates to a wheeled tool carrier. In general, the tool carrier described herein is adapted to be pulled by a conventional tractor and is adapted to mount different types of both working tools or other agricultural implements which are supported at three points. This arrangement allows more convenient application of drawbar pull to such tools.

It is, therefore, a general object of the present invention to provide a novel tool carrier of the type indicated above and incorporating the features which are described hereinafter.

A specific object of the present invention is to provide a tool carrier which allows a farmer having a conventional tractor to use agricultural implements having three spaced points of suspension.

Another object of the present invention is to provide apparatus of this character which avoids the necessity of mounting the tools directly on the tractor thereby localizing the forces on the tractor to straight drawbar pulling forces.

Another object of the present invention is to provide an arrangement of this type which is versatile and easily maneuvered.

Another object of the present invention is to provide an arrangement of this character in which the tractor counterbalances the weight of the pulled tool to advantage.

Another object of the present invention is to provide an arrangement of this character whereby so-called "teeter-totter" action which otherwise occurs when the tractor drops slightly in front causing the tool behind to rise sharply, is avoided.

Another object of the present invention is to provide an arrangement of this character allowing better use of a tool on uneven and hilly terrain.

Another object of the present invention is to provide an arrangement of this character wherein the tools themselves may be transported more easily from one job to another job with a minimum personnel.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
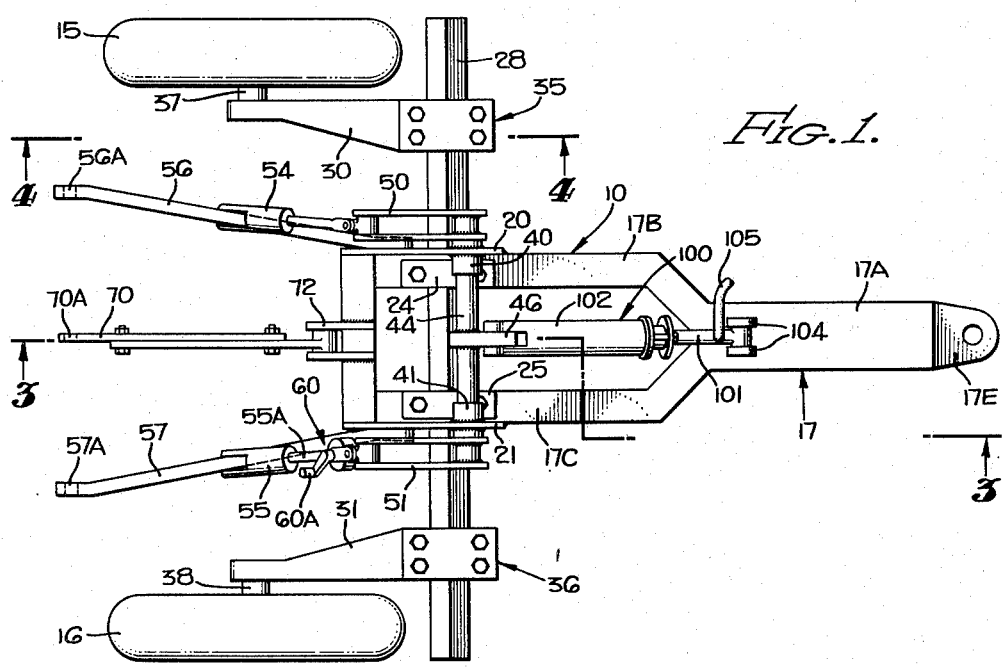
Figure 1 is a plan view of a wheeled vehicle embodying the features of the present invention.

Figures 3 and 4 are views taken respectively on the lines 3—3 and 4—4 in Figure 1.

The wheeled vehicle having the general reference numeral 10 is adapted to mount any one of a plurality of agricultural implements such as, for example, the plow 12 in Figure 3 having a so-called three point attachment, such wheeled vehicle 10 being adapted also to be connected to and pulled by a conventional tractor which has mounted thereon the conventional tractor hitch plate 14, as shown in Figure 3.

The vehicle 10 includes a pair of wheels 15 and 16 which are rotatably supported on the frame 17 which is now described in detail.

The frame or chassis 17 is a welded structure which is generally Y-shaped and includes generally a tongue member 17A to which is welded the tractor hitch plate 17E. The legs 17B and 17C have welded thereto the generally L-shaped plates 20 and 21, respectively, serving as bearing supports as described later. Each of the legs 17B and 17C mounts a clamping structure 24, 25, respectively, for clamping the square supporting rod 28 which extends generally transversely and mounts a pair of wheel supporting arms 30 and 31.

Figure 2:
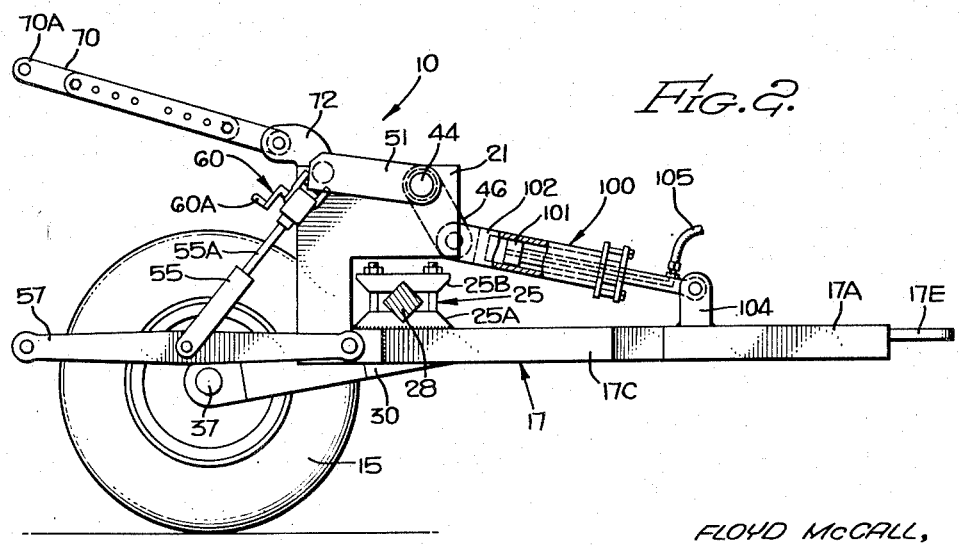
Figure 2 is a side view of the apparatus illustrated in Figure 1.

Each of the clamping structures 24 and 25, as shown in Figure 2, includes two spaced notched plates 25A and 25B adapted to engage diagonal corners of the square rod 28. The plate 25A is welded to the frame leg 17C, while the other plate 25B is secured to the plate 25A by the bolt and nut structure as shown in the drawings.

A similar clamping structure using spaced notched plates secures the wheel supporting arms 30 and 31 on the square shaft 28 as illustrated in Figure 4. These clamping structures associated with the arms 30 and 31 have the general reference numerals 35 and 36, respectively. The lower ends of the arms 30 and 31 have secured thereto the wheel axles 37 and 38, respectively, on which the ground engaging wheels 15 and 16 rotate.

The aforementioned plates 20 and 21 have aligned apertured portions in which the bearing sleeves 40 and 41 are welded to rotatably support the shaft 44 which, as shown in Figure 2, has welded thereto the downwardly extending crank arm 46. Also, opposite ends of the shaft 44 have welded thereto the crank arms 50 and 51, each of such crank arms comprising a pair of spaced plates welded to the shaft 44. The free ends of the crank arms 50 and 51 are pivotally connected to one end of corresponding link structures 54 and 55, the other ends of such link structures 54 and 55 being pivotally secured to an intermediate portion of the tool supporting arms 56 and 57, which, in turn, have one of their ends pivotally secured to the corresponding frame legs 17B and 17C and which have their other ends adapted, by apertures therein, to mount different types of agricultural implements as, for example, the plow 12 as illustrated in Figure 3. Preferably, one of the links 54, 55 is made adjustable in length by incorporating a hand cranked mechanism which has the general reference numeral 60. The particular form of adjustment mechanism, per se, forms no part of the present invention and indeed, may take different forms; and, for example, such adjustment mechanism 60 may comprise a small worm gear mounted on one end of the crank 60A which cooperates with a rack gear (not shown) affixed to the link shaft 55A.

The third tool supporting arm 70 is extensible and comprises two plates which are bolted together with bolts passing through selected ones of a plurality of alignable apertures in the plates as shown in the drawings, such extensible arm 70 being pivotally mounted on the arm 72 which comprises a pair of spaced plates secured to the upstanding plates 20 and 21. The agricultural implement is secured to the free arms 56, 57 and 70, such arms being adapted for that purpose by providing apertured portions 56A, 57A and 70A, respectively, in the free ends of such arms. The two arms 56 and 57 are movable as a unit by the hydraulic ram structure which is now described. The hydraulic ram structure 100 comprises a piston 101 in a cooperating cylinder 102, such cylinder 102 being pivotally secured to the downward end of the crank member 46. The piston 101 is pivotally secured on the spaced standards 104 which are welded to the frame tongue 17A. The piston 101 is made tubular or hollow as shown in Figure 2 so that fluid applied under pressure to the flexible conduit 105 enters the space between the piston and the cylinder to move the crank 46 clockwise in Figure 2 to thereby raise the arms 56 and 57 which are linked to the shaft 44 as described previously. By these means, the tool mounted on the arms 56, 57 and 70 may be raised to different adjusted operating positions or to a carrying position.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a wheeled vehicle having a frame, said frame being generally Y-shaped, notched clamping members mounted on different legs of said Y-shaped frame, a square rod passing through said clamping members and engaged by the notched portions of said clamping members, a pair of wheel supporting arms secured to opposite ends of said rod, a pair of generally L-shaped plates, each secured to a different one of said frame legs and extending generally upwardly, each of said plates incorporating bearing means, a pair of implement supporting arms pivotally mounted on said frame, a shaft passing through said bearing means, means connecting said shaft to said arms to produce pivotal movement of said arms in accordance with rotation movement of said shaft, a crank arm mounted on said shaft, hydraulically operated means acting between said crank arm and said frame for rotating said shaft, a third arm pivotally mounted on said frame and disposed above said pair of arms and midway therebetween, and means adapting the free ends of said pair of arms and said third arm for joint attachment to the same agricultural implement.

2. In an arrangement of the character described, a wheeled vehicle having a generally Y-shaped frame, said frame having a pair of parallel extending legs, a bar extending transversely of said legs, means securing said bar to said legs, a pair of plates secured to opposite one of said legs and extending generally upwardly, a shaft journaled for rotation in said plates, a hydraulic ram disposed between and above said legs, one element of said ram being attached to said shaft for rotating the same, the other element of said ram being attached to said frame, a pair of implement supporting arms pivotally mounted on said frame, a third arm pivotally mounted on said frame above said pair of arms and substantially midway therebetween, and means interconnecting said pair of arms with said shaft to produce pivotal movement of said arms upon operation of said ram.

3. In an arrangement of the character described for use with a pulling tractor, a wheeled vehicle having only two supporting wheels rotatable about a common axis, said vehicle having a frame, means on said frame for adapting the same for attachment to a tractor so as to develop substantially only draw bar forces between said vehicle and said tractor upon movement of said tractor, a three arm implement suspension system comprising three arms pivotally mounted on said frame with two of said arms being pivoted about a common axis which underlies and which is positioned forwardly of the pivoting axis of the other one of said three arms, said other arm extending along the longitudinal axis of said vehicle, the pivot axes of said three arms being located on said frame a substantial distance forwardly of the common axis of said wheels and said arms extending rearwardly past said common axis, means on the ends of each of said three arms adapting said three arm system for attachment to an agricultural implement, and power operated means mounted on said frame for pivotally lifting said three arms with said implement attached thereto.

4. In an arrangement of the character described for use with a pulling tractor, a wheeled vehicle having a frame and only two supporting wheels mounted on said frame rotatable about a common axis, a tongue member connected to said frame and extending along the longitudinal axis of said vehicle, means adapting said tongue member for attachment to a tractor so as to develop substantially only draw bar forces between said vehicle and tractor upon movement of said tractor, a pair of arms pivotally mounted on said frame about a common axis, a third arm extending along the longitudinal axis of said vehicle and pivotally mounted on said frame about an axis which overlies and is disposed rearwardly of said common axis about which said pair of arms are pivotally mounted, the pivot axes of said three arms being located on said frame a substantial distance forwardly of the common axis of said wheels and said arms extending rearwardly past said common axis, means adapting the ends of said pair of arms and said third arm for attachment to an agricultural implement, and means mounted on said frame for pivotally lifting said three arms jointly with said implement connected thereto.

References Cited in the file of this patent

UNITED STATES PATENTS

| | | |
|---|---|---|
| 2,229,372 | Debnam | Jan. 21, 1941 |
| 2,445,145 | Love | July 13, 1948 |
| 2,526,028 | Johnson | Oct. 17, 1950 |
| 2,667,745 | Smith et al. | Feb. 2, 1954 |